United States Patent
Stachowiak

(10) Patent No.: US 7,162,972 B2
(45) Date of Patent: Jan. 16, 2007

(54) WINDOW BIRD FEEDER

(76) Inventor: Robert S. Stachowiak, 2901 Meadowview La., Commerce, TX (US) 75428

( * ) Notice: Subject to any disclaimer, the term of this patent is extended or adjusted under 35 U.S.C. 154(b) by 219 days.

(21) Appl. No.: 10/458,949

(22) Filed: Jun. 11, 2003

(65) Prior Publication Data

US 2004/0250777 A1   Dec. 16, 2004

(51) Int. Cl.
*A01K 39/01* (2006.01)
(52) U.S. Cl. ................................. 119/52.2; D30/124
(58) Field of Classification Search .............. 119/52.2, 119/57.8, 52.1, 52.3, 57.9, 57.6; D30/128, D30/124
See application file for complete search history.

(56) References Cited

U.S. PATENT DOCUMENTS

| 232,124 | A | * | 9/1880 | Hatfield | 119/52.1 |
|---|---|---|---|---|---|
| 4,077,361 | A | * | 3/1978 | Thorp | 119/52.3 |
| 4,201,155 | A | * | 5/1980 | Hyde, Jr. | 119/57.8 |
| 4,242,984 | A | * | 1/1981 | Smith | 119/52.2 |
| 4,331,104 | A | * | 5/1982 | Clarke | 119/52.3 |
| 4,570,575 | A | * | 2/1986 | Hinz | 119/52.2 |
| D290,414 | S | | 6/1987 | Gerber | |
| 4,798,172 | A | * | 1/1989 | Clarke | 119/57.9 |
| 4,881,491 | A | | 11/1989 | Brown | |
| 4,892,060 | A | * | 1/1990 | Lundquist | 119/52.2 |
| 4,903,637 | A | * | 2/1990 | Devault | 119/497 |
| 4,917,050 | A | * | 4/1990 | Clarke | 119/52.3 |
| 4,989,548 | A | * | 2/1991 | Short et al. | 119/52.2 |
| 5,033,411 | A | * | 7/1991 | Brucker | 119/52.2 |
| 5,255,631 | A | * | 10/1993 | Anderson | 119/52.2 |
| 5,289,796 | A | * | 3/1994 | Armstrong | 119/52.3 |
| 5,558,040 | A | * | 9/1996 | Colwell et al. | 119/52.2 |
| 5,771,839 | A | * | 6/1998 | Marsh | 119/52.2 |
| 5,829,384 | A | * | 11/1998 | Landry | 119/52.3 |
| 5,904,330 | A | * | 5/1999 | Manico et al. | 248/206.3 |
| 5,924,381 | A | * | 7/1999 | Bloedorn | 119/52.2 |
| 5,992,349 | A | * | 11/1999 | Sachs | 119/52.1 |
| 6,095,087 | A | * | 8/2000 | Bloedorn | 119/52.2 |
| 6,450,120 | B1 | * | 9/2002 | Nylen | 119/52.2 |
| 6,578,518 | B1 | * | 6/2003 | Conforti | 119/57.8 |

OTHER PUBLICATIONS

Internet Web Page entitled, "The Birding Company—Maine Bay Window Feeder", dated Sep. 15, 2002.
Internet Web Page entitled, "The Birding Company—Sunlight Window Feeder", dated Sep. 15, 2002.
Internet Web Page entitled, "Bird In Flight Window Feeder at BestNest.com", dated Sep. 15, 2002.
Internet Web Page entitled, "Easyview Windowsil Feeder at BestNest.com", dated Sep. 15, 2002.
Internet Web Page entitled, "Deluxe In-House Window Feeder at BestNest.com", dated Sep. 15, 2002.
Internet Web Page entitled, "Songview In-House Window Feeder at BestNest.com", dated Sep. 15, 2002.

(Continued)

*Primary Examiner*—Robert P. Swiatek
(74) *Attorney, Agent, or Firm*—Marlin R. Smith; Smith IP Services, P.C.

(57) ABSTRACT

A window bird feeder. In a described embodiment, a window bird feeder includes a bird feed storage compartment bounded by an arch fastened to a base. The arch has openings therethrough for dispensing bird feed from the storage compartment onto the base. A rail on a front wall of the storage compartment separates a bird feed dispensing area of the base from a bird positioning area of the base. An upper lip and a lid of the bird feeder are configured for ease of filling the storage compartment.

21 Claims, 2 Drawing Sheets

OTHER PUBLICATIONS

Internet Web Page entitled, "Songbird Window Feeder at BestNest. com", dated Sep. 15, 2002.
Internet Web Page entitled, "Solarium Mirrored Avarium Bird Feeder—Regular at BestNest.com", dated Sep. 15, 2002.
Internet Web Page entitled, "Casement Window Feeder at Best Nest.com", dated Sep. 15, 2002.
Internet Web Page entitled, "Plow & Hearth", dated Sep. 15, 2002.
Internet Web Page entitled, "Window Feeders", dated Sep. 15, 2002.
Internet Web Page entitled, "Window Bird Feeders at BestNest. com!", dated Sep. 15, 2002.
Internet Web Page entitled, "Deluxe Easyview Hopper Windowsill Feeder at BestNest.com", dated Sep. 15, 2002.
Three photos of a bird feeder advertised as a Songbird Window Feeder.
Five photos of a bird feeder (Bird Feeder II).

* cited by examiner

WINDOW BIRD FEEDER

BACKGROUND

The present invention relates generally to bird feeder design and, in an embodiment described herein, more particularly provides an improved window bird feeder.

It is known in the art to provide a window bird feeder. One such design has a bird feed storage compartment with an arched lower wall. Bird feed is dispensed from the storage compartment by passing between lower edges of the arched wall and a base of the bird feeder. The arched wall provides a convenient opening for viewing feeding birds from a rear of the bird feeder, which is mounted to a window.

However, past window bird feeders suffer from several deficiencies. Where an arched wall is used, the wall is typically supported by inserting its edges into grooves formed in vertical walls bounding the bird feed storage compartment. This weakens the vertical walls and is time-consuming to manufacture, in that it necessitates the forming of arched grooves in the vertical walls and accurate positioning of the arched wall in the grooves.

Another problem is that the storage compartment is inconvenient to fill. A lid for filling the storage compartment is typically hinged to a front wall of the storage compartment. Thus, the lid is pivoted away from the window on which the bird feeder is mounted, and in this position the lid interferes with the filling process. A bird feed receiving opening under the lid is also not configured for convenient pouring of bird seed into the storage compartment.

Yet another problem with existing designs is that the bird feed is dispensed onto the base, in an area contiguous with an area on which birds perch to consume the bird feed. Thus, the bird feed is frequently wasted by birds displacing the bird feed, wind blowing the bird feed off of the base, etc.

From the foregoing, it can be seen that it would be quite desirable to provide an improved window bird feeder.

SUMMARY

In carrying out the principles of the present invention, in accordance with an embodiment thereof, an improved window bird feeder is provided. The bird feeder includes features which solve the above described problems of past window bird feeder designs.

In one aspect of the invention, a window bird feeder is provided which includes a base onto which bird feed is dispensed for consumption by birds from a bird feed storage compartment. The storage compartment is bounded at a lower periphery thereof at least partially by an arch having opposite ends. Each of the opposite ends is fastened directly to the base.

In another aspect of the invention, a window bird feeder is provided which includes a bird feed storage compartment bounded laterally by at least one wall, and bounded at a lower periphery at least partially by a base. The base has a first area onto which bird feed is dispensed from the storage compartment for consumption by birds, and a second area onto which birds are positioned during bird feed consumption. The wall has an opening therein permitting passage of bird feed between the first and second areas through the wall opening, and the wall further has a substantially vertical and generally horizontally extending rail below the wall opening and separating the first area from the second area.

In a further aspect of the invention, a window bird feeder is provided which includes a bird feed storage compartment bounded at least partially at an upper periphery thereof by a lid. The storage compartment has an upper lip at least partially bounding an upper bird feed receiving opening of the storage compartment. An interior surface of the upper lip is beveled outwardly, so that an area of the upper bird feed receiving opening increases in an upward direction. A hinge is attached exteriorly to the lid for pivoting displacement of the lid relative to the bird feed receiving opening.

In yet another aspect of the invention, a window bird feeder is provided which includes a bird feed storage compartment bounded at least partially at a lower periphery thereof by an arch, and a base onto which bird feed is dispensed from the storage compartment for consumption by birds. The arch has at least one bird feed dispensing opening formed therethrough which permits passage of bird feed from the storage compartment onto the base.

These and other features, advantages, benefits and objects of the present invention will become apparent to one of ordinary skill in the art upon careful consideration of the detailed description of a representative embodiment of the invention hereinbelow and the accompanying drawings.

DETAILED DESCRIPTION

Figure 1:
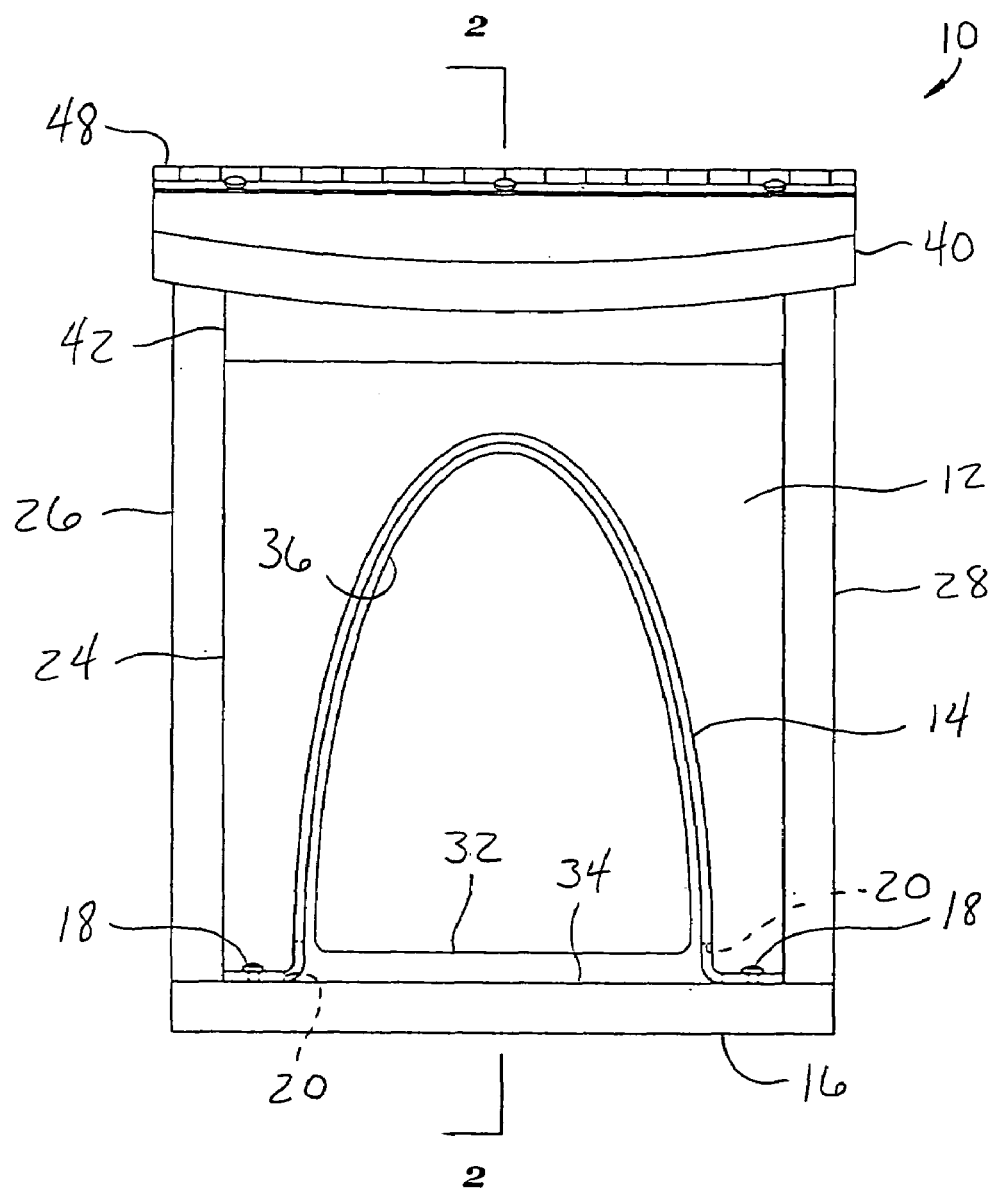
FIG. 1 is a front elevational view of a window bird feeder embodying principles of the present invention.

Representatively illustrated in FIG. 1 is a window bird feeder 10 which embodies principles of the present invention. In the following description of the bird feeder 10 and other apparatus and methods described herein, directional terms, such as "above", "below", "upper", "lower", etc., are used only for convenience in referring to the accompanying drawings. Additionally, it is to be understood that the embodiment of the present invention described herein may be utilized in various orientations, such as inclined, inverted, horizontal, vertical, etc., and in various configurations, without departing from the principles of the present invention.

The bird feeder 10 includes a bird feed storage compartment 12 in which bird feed is stored, and from which bird feed is dispensed for consumption by birds. In one unique aspect of the invention, the storage compartment 12 is bounded at a lower periphery thereof by an arch 14 which is fastened directly to a base 16. The arch 14 is fastened to the base 16 by fasteners, such as screws 18, which extend through each opposite end of the arch and into the base. Of course, other fastening methods may be used in keeping with the principles of the invention.

Note that the arch 14 is not received in any of multiple walls 24, 26, 28, 30 laterally bounding the storage compartment 12. Thus, the lateral walls 24, 26, 28, 30 are not weakened by grooves, etc. formed therein for receiving the arch 14. Instead, the arch 14 is self-supporting on the base 16. However, if desired, the arch 14 could be received in one or more of the lateral walls 24, 26, 28, 30, or otherwise supported, without departing from the principles of the invention.

Preferably, the arch 14 is thermoformed from clear acrylic. However, the arch 14 may alternatively be formed from another plastic or another material, such as sheet metal, without departing from the principles of the invention.

Preferably, the rear wall 30 is made of a material, or includes a material, which permits birds on one side of the wall to be viewed from an opposite side of the wall while preventing the birds from viewing persons, etc. on the opposite side of the wall. Thus, the wall 30 may function as a "two-way" mirror. However, the wall 30 may alternatively be clear, or may include an opening for viewing the birds, without departing from the principles of the invention.

In another unique aspect of the invention, the arch 14 has bird feed dispensing openings 20 formed therethrough which permit bird feed to pass from the storage compartment 12 onto an upwardly facing surface area 22 of the base 16. The area 22 is visible in FIGS. 2 and 3, which representatively illustrate cross-sectional views of the bird feeder 10.

Figure 2:
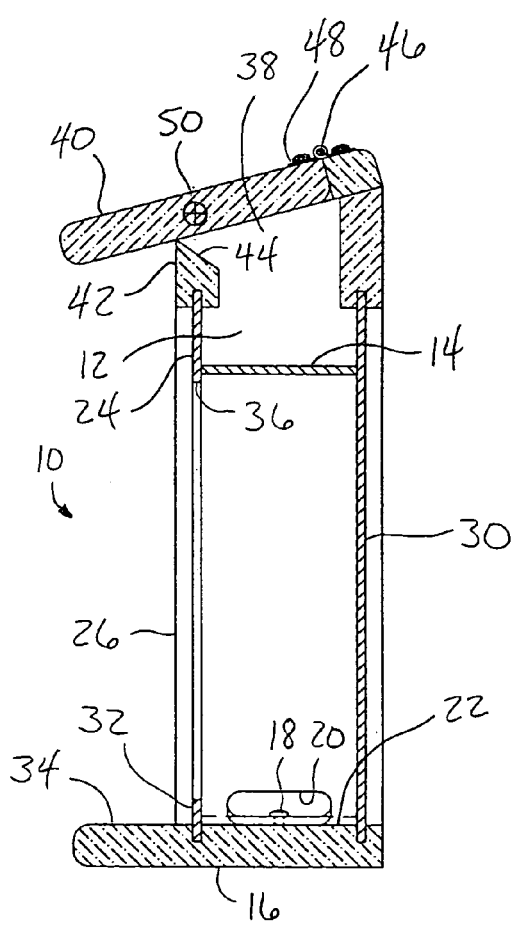
FIG. 2 is a cross-sectional view through the bird feeder, taken along line 2—2 of FIG. 1.
Figure 3:
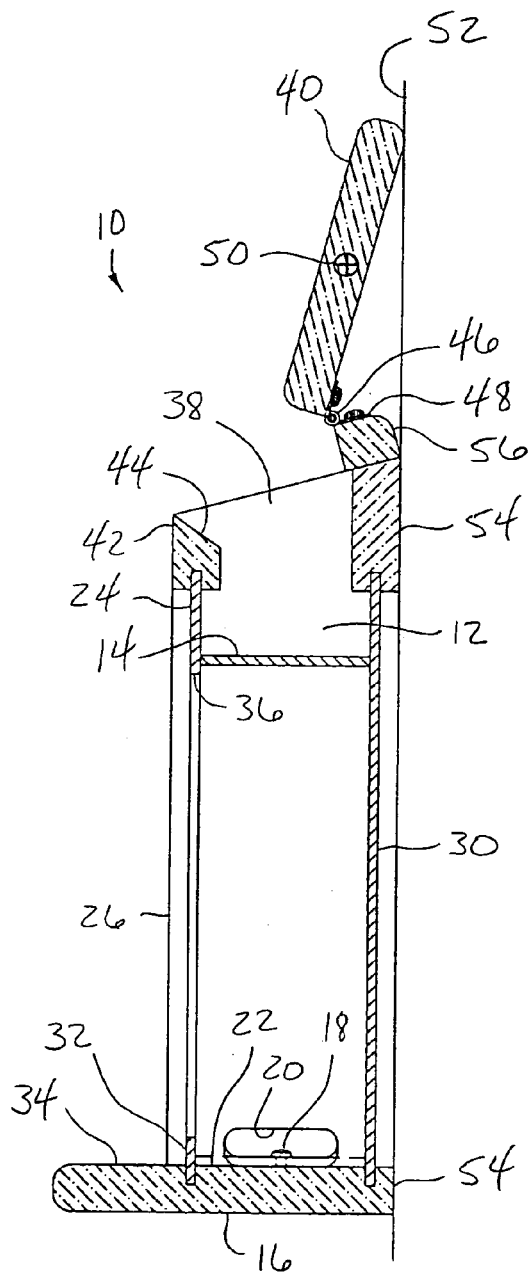
FIG. 3 is another cross-sectional view through the bird feeder, showing a bird feed loading configuration thereof.

As may be clearly seen in FIGS. 1–3, the material of the arch 14 completely circumscribes each of the openings 20.

Note that the opposite ends of the arch 14 extend all the way to the base 16 (and are fastened directly thereto as described above), and so bird feed is not dispensed from the storage compartment 12 by passing through a space between the arch and the base. However, other dispensing methods may be used, without departing from the principles of the invention.

In yet another unique aspect of the invention, the wall 24 at a front side of the storage compartment 12 includes a vertical rail 32 which separates the bird feed dispensing area 22 of the base 16 from another upper surface area 34 of the base on which birds are positioned while consuming bird feed. The rail 32 prevents the bird feed from inadvertently displacing from the area 22 to the area 34 where the bird feed may be wasted.

Lateral support for the rail 32 is provided by inserting a lower portion of the rail into a groove formed in the base 16. The rail 32 is preferably oriented substantially vertical and extends generally horizontally to separate the areas 22, 34.

The rail 32 is positioned below an arched opening 36 formed through the front wall 24. Thus, birds may perch on the area 34 while consuming bird feed from the area 22 through the opening 36. The rail 32 prevents the birds, wind, etc. from displacing the bird feed from the area 22 to the area 34 along the upper surface of the base. Of course, other configurations of these features may be used in keeping with the principles of the invention.

In a further unique aspect of the invention, a bird feed receiving opening 38 and associated lid 40 are specially configured for ease of filling the storage compartment 12 with bird feed. An upper lip 42 of the storage compartment 12 has an inner beveled surface 44, so that an area of the opening 38 increases in an upward direction. That is, the opening 38 is at least partially funnel-shaped due to the beveled surface 44 on the lip 42.

This funnel-shaped opening 38 aids in preventing waste when the storage compartment 12 is filled with bird feed. The lip 42 also serves to laterally support the front wall 24, since an upper end of the front wall is received in a groove formed in a lower side of the lip.

The lid 40 pivots about an axis of rotation 46 of a hinge 48 exteriorly attached to the lid. When the lid 40 is in a closed position, as depicted in FIG. 2, a center of mass 50 of the lid is positioned on one lateral side of the axis of rotation 46. This aids in keeping the lid 40 closed. A bird, squirrel or other weight inadvertently resting on the lid 40 will not cause the lid to open.

When the lid 40 is in an open position, as depicted in FIG. 3, the center of mass 50 of the lid is positioned on an opposite lateral side of the axis of rotation 46. Thus, the center of mass 50 laterally traverses the axis of rotation 46 when the lid 40 is pivoted between its open and closed positions. A spacer 56 is used to space the hinge 48 and its axis of rotation 46 away from a window surface 52 to which the bird feeder lo is mounted.

In the open position, the center of mass 50 is positioned laterally between the axis of rotation 46 and the window surface 52. The window surface 52 holds the lid 40 in its open position, while the positioning of the center of mass 50 relative to the axis of rotation 46 prevents the lid from inadvertently closing. Note that the window surface 52 is aligned with rear surface areas 54 of the bird feeder lo preferably used to mount the bird feeder to the window surface, such as by using suction cups, double-stick tape, hook and loop fasteners, etc.

However, other methods of mounting the bird feeder lo may be utilized if the bird feeder cannot be mounted directly to the window surface 52, such as if the window is outfitted with a screen or if panes of glass in the window are too small. For example, the bird feeder 10 may be spaced away from the window by suspending it from a roof overhang or by mounting the bird feeder on a post, without departing from the principles of the invention.

Of course, a person skilled in the art would, upon a careful consideration of the above description of representative embodiments of the invention, readily appreciate that many modifications, additions, substitutions, deletions, and other changes may be made to these specific embodiments, and such changes are contemplated by the principles of the present invention. Accordingly, the foregoing detailed description is to be clearly understood as being given by way of illustration and example only, the spirit and scope of the present invention being limited solely by the appended claims and their equivalents.

What is claimed is:

1. A window bird feeder, comprising:
   a base onto which bird feed is dispensed for consumption by birds; and
   a bird feed storage compartment bounded at a lower periphery thereof at least partially by an arch having opposite ends, each of the opposite ends being fastened directly to the base without extending into the base, and the arch overlying the base continuously between the opposite ends.

2. The bird feeder according to claim 1, wherein each of the arch opposite ends is fastened to the base using at least one fastener which extends through the opposite end and into the base.

3. The bird feeder according to claim 1, wherein the storage compartment is bounded laterally by multiple walls, and wherein the arch does not extend into any of the walls.

4. A window bird feeder, comprising:
   a base onto which bird feed is dispensed for consumption by birds; and
   a bird feed storage compartment bounded at a lower periphery thereof at least partially by an arch having opposite ends, each of the opposite ends being fastened directly to the base without extending into the base, the arch including at least one opening formed therethrough, the arch opening permitting bird feed to pass from the storage compartment onto the base, and a material of the arch completely circumscribing the arch opening.

5. The bird feeder according to claim 4, wherein the bird feed storage compartment is bounded laterally by at least one wall, and is bounded at a lower periphery at least partially by the base, the base having a first area onto which bird feed is dispensed from the storage compartment for consumption by birds, and a second area onto which birds are positioned during bird feed consumption, the at least one wall having an opening therein permitting passage of bird feed between the first and second areas through the wall opening, and the at least one wall further having a substantially vertical rail below the wall opening and separating the first area from the second area, and the rail extending into the base.

6. The bird feeder according to claim 5, further comprising a lid bounding at least partially an upper periphery of the storage compartment, and a hinge operative to pivot the lid between closed and open positions, and wherein a center of mass of the lid laterally traverses an axis of rotation of the hinge when the lid is pivoted between the closed and open positions.

7. The bird feeder according to claim 6, wherein the hinge has a leaf attached to an exterior surface of the lid.

8. A window bird feeder, comprising:
a base onto which bird feed is dispensed for consumption by birds;
a bird feed storage compartment bounded at a lower periphery thereof at least partially by an arch having opposite ends, each of the opposite ends being fastened directly to the base without extending into the base; and
a lid bounding at least partially an upper periphery of the storage compartment, and a hinge operative to pivot the lid between closed and open positions, and wherein a center of mass of the lid laterally traverses an axis of rotation of the hinge when the lid is pivoted between the closed and open positions.

9. The bird feeder according to claim 8, wherein the bird feed storage compartment has an upper lip at least partially bounding an upper bird feed receiving opening of the storage compartment, an interior surface of the upper lip being beveled outwardly, so that an area of the upper bird feed receiving opening increases in an upward direction; and wherein at least one leaf of the hinge is attached to an exterior surface of the lid.

10. The bird feeder according to claim 9, wherein the storage compartment is laterally bounded by at least one wall, and wherein the wall is received into the upper lip.

11. The bird feeder according to claim 9, wherein the arch includes at least one bird feed dispensing opening formed therethrough, the at least one bird feed dispensing opening permitting bird feed to pass from the storage compartment onto the base.

12. The bird feeder according to claim 11, wherein a material of the arch completely circumscribes the at least one opening.

13. The bird feeder according to claim 8, wherein the hinge has a leaf attached to an exterior surface of the lid.

14. A window bird feeder, comprising:
a bird feed storage compartment bounded at least partially at a lower periphery thereof by an arch; and
a base onto which bird feed is dispensed from the storage compartment for consumption by birds,
the arch having at least one bird feed dispensing opening formed therethrough which permits passage of bird feed from the storage compartment onto the base, a material of the arch completely circumscribing the at least one opening.

15. The bird feeder according to claim 14, wherein the arch has opposite ends, each of the opposite ends extending to the base.

16. The bird feeder according to claim 15, wherein each of the arch opposite ends is fastened directly to the base.

17. The bird feeder according to claim 15, wherein the arch does not extend into the base.

18. The bird feeder according to claim 14, wherein the storage compartment is bounded laterally by multiple walls, and wherein the arch does not extend into any of the walls.

19. The bird feeder according to claim 14, further comprising an upper lip at least partially bounding an upper bird feed receiving opening of the storage compartment, an interior surface of the upper lip being beveled outwardly, so that an area of the upper bird feed receiving opening increases in an upward direction.

20. The bird feeder according to claim 14, wherein the storage compartment is bounded at least partially at an upper periphery thereof by a lid, and further comprising a hinge attached exteriorly to the lid for pivoting displacement of the lid relative to a bird feed receiving opening of the storage compartment, the hinge being operative to pivot the lid between closed and open positions relative to the bird feed receiving opening, and wherein a center of mass of the lid laterally traverses an axis of rotation of the hinge when the lid is pivoted between the closed and open positions.

21. The bird feeder according to claim 20, wherein the hinge has a leaf attached to an exterior surface of the lid.

* * * * *